May 7, 1929.  V. A. HANSEN  1,711,677
FLY AND BAIT KIT
Filed March 24, 1927
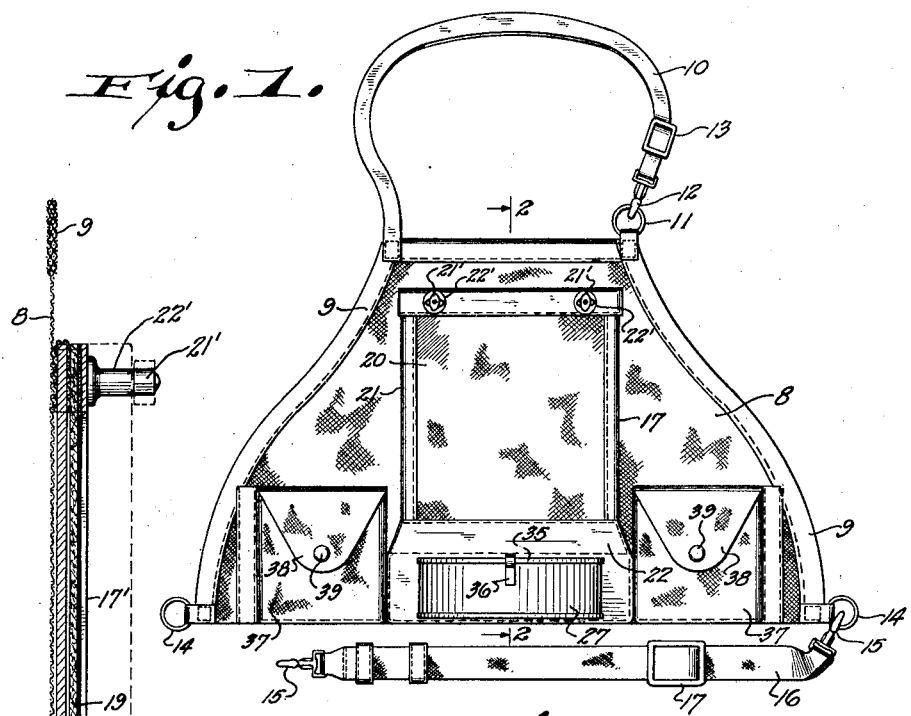
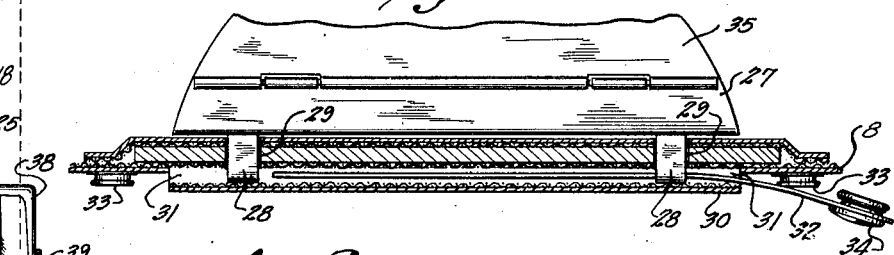
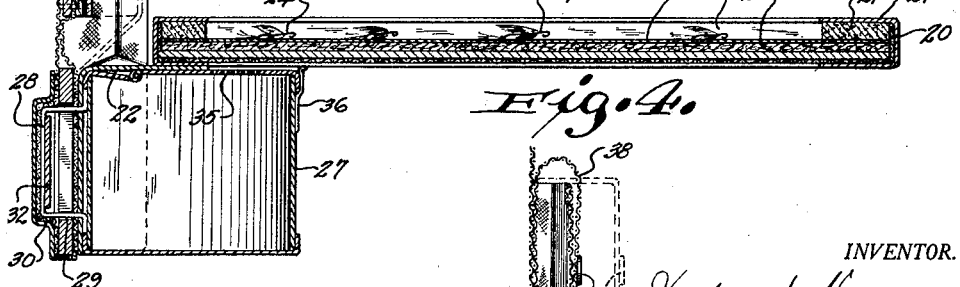
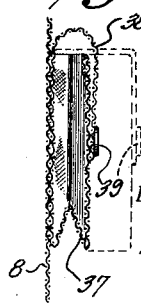
INVENTOR.
Victor A. Hansen.
BY Morsell, Keeney & Morsell,
ATTORNEYS.

Patented May 7, 1929.

1,711,677

UNITED STATES PATENT OFFICE.

VICTOR A. HANSEN, OF WAUSAU, WISCONSIN.

FLY AND BAIT KIT.

Application filed March 24, 1927. Serial No. 177,955.

This invention relates to improvements in fly and bait kits.

It is one of the objects of the present invention to provide a fly and bait kit which may be easily suspended and belted to the user in a manner to permit easy access to all portions of the kit while fishing.

A further object of the invention is to provide a fly and bait kit having a foldable panel cover for holding artificial flies and leaders in a moist condition, so that they are ready for instant use.

A further object of the invention is to provide a fly and bait kit in which the panel cover when in open position serves as a shelf for supporting flies and other small articles used in the craft.

A further object of the invention is to provide a fly and bait kit having easily accessible pockets for holding various articles used in fishing, and also having an easily removable covered box for holding bait.

A further object of the invention is to provide a fly and bait kit having belts or straps for connecting to the user which are easily adjustable when desired.

A further object of the invention is to provide a fly and bait kit which is of simple construction, is strong and durable and is well adapted for the purpose desired.

With the above and other objects in view, the invention consists of the improved fly and bait kit and its parts and combinations as set forth in the claims, and all equivalents thereof.

In the accompanying drawing in which the same reference characters indicate the same parts in all of the views:

Fig. 1 is a front view of the improved fly and bait kit;

Fig. 2 is a vertical sectional view thereof on a larger scale, taken on line 2—2 of Fig. 1;

Fig. 3 is a horizontal sectional detail view illustrating the manner of removably attaching the bait box to the apron portion of the kit; and Fig. 4 is a sectional detail view of one of the pockets of the kit.

Referring to the drawing, the numeral 8 indicates the apron or body portion of the kit, which is preferably formed of waterproof canvas or other like material having a binding 9 sewed along its edge. The apron is somewhat of triangular form, with the part of less width above and provided at one corner with a strap 10 adapted to extend around the neck of the user. The other upper corner of the apron is provided with a ring 11 which is engaged by a snap hook 12 fastened to the free looped end of the neck strap 10. Said looped end has a buckle engagement 13 with the strap to adjust the length of said strap. The lower corners of the apron are provided with rings 14 for connection with the snap hooks 15 attached to the opposite ends of a belt 16. The belt by means of the buckle 17 is adjustable as to length, and is adapted to extend around the waist of the user to hold the apron in position on the wearer.

The central portion of the apron has connected thereto a rectangular panel 17 formed of a leather border 17′ with a cotton or felt inner part 18 and a moss pad 19 for holding moisture. A panel cover 20 is of similar construction as the panel and has an edge binder 21 of leather which is connected at its lower edge to the apron, to form a hinge connection 22 therebetween. This construction permits the panel cover to be swung to a horizontal position when it is desired to remove or place flies or leaders within the enclosure formed by the panels. The portion 21′ of the binder 21 is formed of cork, and is of sufficient thickness to provide a space 23 between the two panels to accommodate artificial flies 24 or leaders (not shown). The panels are lined with cotton material 25 which will permit the hook points to be easily caught therein, and beneath the cotton lining a padding of moss, or other absorbent material, 26 is placed to hold moisture and keep the lining 25 and the flies and leaders damp. The waterproof canvas on the inner side of the apron prevents the moisture from working therethrough and wetting the user. The apron is provided with turn-button latches 21′ which extend through openings 22′ in the cover panel for latching the cover in closed position.

A metal bait box 27 having a straight rear portion is provided with two rearwardly extending loops 28 which extend into vertically extending slots 29 formed in the apron 8. A strip of material 30, preferably leather, is sewed to the back of the apron over the elongated slots, and is provided with transverse slits 31 to permit the insertion of a belt 32 preferably formed of fiber. Said belt extends through the slits 31 and the loops 28 of the bait box, to removably attach the box to the apron, as clearly shown in Figs. 2 and 3. The opposite end portions of the strip 30 are provided with snap fasteners 33, either one of which may be engaged by a coacting snap member 34 carried by one end portion of the belt to permit insertion of the belt through either slit. The box is provided with a hinged cover 35 having a snap latch 36 for holding it in closed position.

The bait box 27 is so positioned with relation to the panel cover hinge 22 that when the panel cover is swung downwardly, it will rest in horizontal position on top of the bait box and thus hold the cover in the form of a shelf to permit the easy removal or replacement of the flies and changing flies on the leader.

Pockets 37 positioned on opposite sides of the bait box are of the collapsible type and formed of waterproof canvas, and are provided with covers 38 having snap buttons 39 for holding the covers in closed position. These pockets are convenient for holding various small articles used in fishing.

In use, the apron is placed on the chest of the wearer with the upper strap extending around the neck and the lower strap placed around the waist, and in addition to the use described, the apron also serves as a chest protector.

From the foregoing description, it will be seen that the kit is of very simple construction and is well adapted for the purpose described.

What I claim as my invention is:

1. A fly and bait kit, comprising an apron having a panel, a neck strap connected to the upper edge portion of the apron, a waist strap connected to the lower portion of the apron, a panel cover hinged at its lower edge to the apron and movable upwardly to close access to the apron panel and forming a space between the two panels to receive articles used in fishing, said panels being of moisture holding construction and lined with a material permitting the points of hooks to easily and removably enter the material to hold the hooks, turn buttons for holding the apron cover in closed position, a bait box removably connected to the apron and positioned to hold the panel cover in open and approximately horizontal position, and pockets connected to the front portion of the apron on opposite sides of the bait box and having closing flaps.

2. A fly and bait kit, comprising an apron having a panel, a neck strap connected to the upper edge portion of the apron, a waist strap connected to the lower portion of the apron, a panel cover hinged at its lower edge to the apron and movable upwardly to close access to the apron panel and forming a space between the two panels to receive articles used in fishing, said panels being of moisture holding construction and lined with a material permitting the points of hooks to easily and removably enter the material to hold the hooks, turn buttons for holding the apron cover in closed position, a bait box removably connected to the apron and positioned to hold the panel cover in open and approximately horizontal position, said bait box having loops on its inner side which extend through openings formed in the apron, a bolt member slidably extending through the box loops to attach it to the apron, and pockets connected to the front portion of the apron on opposite sides of the bait box and having closing flaps.

3. A fly and bait kit, comprising an apron having a vertical panel, a panel cover hinged to the apron and movable downwardly to a horizontal position to permit access to the inner sides of both panels, said panel cover when in closed position forming a space between the two panels for receiving articles used in fishing, means forming part of the two panels for holding moisture, means for holding the panel cover in closed vertical position, and neck and waist strap means for attaching the apron to the wearer.

4. A fly and bait kit, comprising an apron having a vertical panel, a panel cover hinged at its lower edge to the apron and movable downwardly to a horizontal position to permit access to the inner sides of both panels, said panel cover when in closed position forming a space between the two panels for receiving articles used in fishing, both panels being formed in part of moisture holding material, means for holding the panel cover in open horizontal position, means for holding the panel cover in closed vertical position, and neck and waist strap means for attaching the apron to the wearer.

5. A fly and bait kit, comprising an apron having a vertical panel, a panel cover hinged at its lower edge to the apron and movable vertically to close access to the apron panel, said panels forming a space between the two panels to receive articles used in fishing, said panels also being of moisture holding construction and lined with a material permitting the points of artificial fly hooks to easily and removably enter the material to hold the flies, pockets attached to the apron, means for holding the panel cover in closed vertical position, and neck and waist strap means for attaching the apron to the wearer.

6. A fly and bait kit, comprising an apron having a vertical panel, a panel cover hinged at its lower edge to the apron and movable vertically to close access to the apron, said panels forming a space between the two panels to receive articles used in fishing, said panels also being of moisture holding construction and lined with a material permitting the points of artificial fly hooks to easily and removably enter the material to hold the flies, means for holding the panel cover in closed vertical position, pockets attached to the apron, a bait box connected to the apron below the panels to hold the panel cover in open horizontal position, and neck and waist strap means for attaching the apron to the wearer.

In testimony whereof, I affix my signature.

VICTOR A. HANSEN.